United States Patent
Henderkott et al.

(10) Patent No.: US 12,157,192 B2
(45) Date of Patent: Dec. 3, 2024

(54) REPAIR OF DUAL WALLED METALLIC COMPONENTS USING BRAZE MATERIAL

(71) Applicant: Rolls-Royce Corporation, Indianapolis, IN (US)

(72) Inventors: Joseph Peter Henderkott, Indianapolis, IN (US); Raymond Ruiwen Xu, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/362,603

(22) Filed: Jul. 31, 2023

(65) Prior Publication Data
US 2023/0405742 A1     Dec. 21, 2023

Related U.S. Application Data

(60) Continuation of application No. 16/984,624, filed on Aug. 4, 2020, now Pat. No. 11,731,218, which is a
(Continued)

(51) Int. Cl.
| | |
|---|---|
| *B23K 1/00* | (2006.01) |
| *B23K 1/20* | (2006.01) |

(Continued)

(52) U.S. Cl.
CPC .......... *B23P 6/005* (2013.01); *B23K 1/0018* (2013.01); *B23K 1/20* (2013.01); *B23P 6/045* (2013.01); *F01D 5/005* (2013.01); *F02C 7/18* (2013.01); *F23R 3/002* (2013.01); *F05D 2220/32* (2013.01); *F05D 2230/237* (2013.01);
(Continued)

(58) Field of Classification Search
CPC . F01D 5/005; F01D 5/18; F01D 5/181; F01D 5/183; F01D 5/184; F05D 2220/32; F05D 2230/237; F05D 2230/80; F05D 2240/35; F05D 2260/202; B23K 1/00;
(Continued)

(56) References Cited

U.S. PATENT DOCUMENTS

| | | |
|---|---|---|
| 3,024,109 A | 3/1962 | Hoppin, III et al. |
| 3,517,428 A | 6/1970 | Gadd |

(Continued)

FOREIGN PATENT DOCUMENTS

| | | |
|---|---|---|
| CN | 105091030 A | 11/2015 |
| DE | 10319494 A1 | 11/2004 |

(Continued)

OTHER PUBLICATIONS

Extended European Search Report from counterpart European Application number 16157440.0, dated Aug. 1, 7 pp.
(Continued)

*Primary Examiner* — David E Sosnowski
*Assistant Examiner* — Maxime M Adjagbe
(74) *Attorney, Agent, or Firm* — Shumaker & Sieffert, P.A.

(57) ABSTRACT

A dual walled component includes a spar comprising a plurality of pedestals; a coversheet attached to a first set of pedestals from the plurality of pedestals; and a repaired coversheet portion attached to a second set of pedestals from the plurality of pedestals and to the coversheet, where the repaired coversheet portion includes a braze material.

20 Claims, 5 Drawing Sheets

Related U.S. Application Data division of application No. 15/053,082, filed on Feb. 25, 2016, now Pat. No. 10,766,105.

(60) Provisional application No. 62/121,269, filed on Feb. 26, 2015.

(51) Int. Cl.
*B23P 6/00* (2006.01)
*B23P 6/04* (2006.01)
*F01D 5/00* (2006.01)
*F02C 7/18* (2006.01)
*F23R 3/00* (2006.01)

(52) U.S. Cl.
CPC ...... *F05D 2230/80* (2013.01); *F05D 2240/35* (2013.01); *F05D 2260/202* (2013.01)

(58) Field of Classification Search
CPC ......... B23K 1/0018; B23K 1/20; B23P 6/005; B23P 6/045
See application file for complete search history.

(56) References Cited

U.S. PATENT DOCUMENTS

| | | | |
|---|---|---|---|
| 3,706,203 A | 12/1972 | Goldberg et al. | |
| 3,806,276 A | 4/1974 | Aspinwall | |
| 3,906,617 A | 9/1975 | Behringer et al. | |
| 4,695,247 A | 9/1987 | Enzaki et al. | |
| 4,980,241 A | 12/1990 | Hoffmueller et al. | |
| 5,100,050 A | 3/1992 | Krueger et al. | |
| 5,332,360 A | 7/1994 | Correia et al. | |
| 5,640,767 A | 6/1997 | Jackson et al. | |
| 5,797,725 A | 8/1998 | Rhodes | |
| 5,976,337 A | 11/1999 | Korinko et al. | |
| 6,003,754 A * | 12/1999 | Rhodes ............... B23K 31/02 228/5.5 | |
| 6,172,327 B1 | 1/2001 | Aleshin et al. | |
| 6,199,746 B1 | 3/2001 | Dupree et al. | |
| 6,213,714 B1 | 4/2001 | Rhodes | |
| 6,214,248 B1 | 4/2001 | Browning et al. | |
| 6,575,702 B2 | 6/2003 | Jackson et al. | |
| 6,602,053 B2 | 8/2003 | Subramanian et al. | |
| 6,837,417 B2 | 1/2005 | Srinivasan | |
| 7,051,435 B1 | 5/2006 | Subramanian et al. | |
| 7,080,971 B2 | 7/2006 | Wilson et al. | |
| 7,146,725 B2 | 12/2006 | Kottilingam et al. | |
| 7,484,928 B2 | 2/2009 | Arness et al. | |
| 7,731,809 B2 | 6/2010 | Hu | |
| 7,761,989 B2 | 7/2010 | Lutz et al. | |
| 7,810,237 B2 | 10/2010 | Lange et al. | |
| 7,966,707 B2 | 6/2011 | Szela et al. | |
| 8,052,391 B1 | 11/2011 | Brown | |
| 8,070,450 B1 | 12/2011 | Ryznic et al. | |
| 8,087,565 B2 | 1/2012 | Kottilingam et al. | |
| 8,247,733 B2 | 8/2012 | Zhu | |
| 8,356,409 B2 | 1/2013 | Perret | |
| 8,528,208 B2 | 9/2013 | Rebak et al. | |
| 8,539,659 B2 | 9/2013 | Szela et al. | |
| 8,555,500 B2 | 10/2013 | Vossberg et al. | |
| 8,739,404 B2 | 6/2014 | Bunker et al. | |
| 8,800,298 B2 | 8/2014 | Ladd et al. | |
| 8,875,392 B2 | 11/2014 | Richter | |
| 9,003,657 B2 | 4/2015 | Bunker et al. | |
| 9,085,980 B2 | 7/2015 | Mittendorf et al. | |
| 9,174,312 B2 | 11/2015 | Baughman et al. | |
| 9,228,958 B2 | 1/2016 | Shirkhodaie et al. | |
| 9,254,537 B2 | 2/2016 | Li et al. | |
| 9,476,306 B2 | 10/2016 | Bunker | |
| 9,751,147 B2 | 9/2017 | Rhodes et al. | |
| 9,810,069 B2 | 11/2017 | Dubs et al. | |
| 9,863,249 B2 | 1/2018 | Shinn et al. | |
| 10,450,871 B2 | 10/2019 | Henderkott et al. | |
| 10,689,984 B2 | 6/2020 | Varney | |
| 10,766,105 B2 | 9/2020 | Henderkott et al. | |
| 11,338,396 B2 | 5/2022 | Bulgrin et al. | |
| 2003/0026697 A1 | 2/2003 | Subramanian et al. | |
| 2004/0086635 A1 | 5/2004 | Grossklaus et al. | |
| 2005/0217110 A1 | 10/2005 | Topal | |
| 2006/0120869 A1 | 6/2006 | Wilson et al. | |
| 2007/0044306 A1 | 3/2007 | Szela et al. | |
| 2007/0163684 A1 | 7/2007 | Hu | |
| 2008/0011813 A1 | 1/2008 | Bucci et al. | |
| 2009/0026182 A1 | 1/2009 | Hu et al. | |
| 2009/0191422 A1* | 7/2009 | Tryon ............... C23C 28/3215 427/580 | |
| 2009/0194247 A1 | 8/2009 | Kriegl | |
| 2009/0196761 A1 | 8/2009 | James | |
| 2009/0255116 A1 | 10/2009 | McMasters et al. | |
| 2009/0324841 A1 | 12/2009 | Arrell et al. | |
| 2010/0124492 A1 | 5/2010 | Tucker et al. | |
| 2010/0176097 A1 | 7/2010 | Zhu | |
| 2010/0257733 A1 | 10/2010 | Guo et al. | |
| 2011/0051179 A1 | 3/2011 | Iga | |
| 2011/0185739 A1 | 8/2011 | Bronson et al. | |
| 2012/0179285 A1 | 7/2012 | Melzer-Jokisch et al. | |
| 2012/0222306 A1 | 9/2012 | Mittendorf et al. | |
| 2013/0195674 A1 | 8/2013 | Watson et al. | |
| 2014/0003948 A1 | 1/2014 | Dubs et al. | |
| 2014/0030497 A1* | 1/2014 | Tryon ............... C23C 28/3215 428/335 | |
| 2014/0044939 A1 | 2/2014 | Hunt et al. | |
| 2014/0169943 A1 | 6/2014 | Bunker et al. | |
| 2014/0259666 A1 | 9/2014 | Baughman et al. | |
| 2014/0271153 A1 | 9/2014 | Uskert et al. | |
| 2014/0302278 A1 | 10/2014 | Bunker | |
| 2015/0016947 A1* | 1/2015 | Kwon ............... F01D 5/187 415/1 | |
| 2015/0016972 A1 | 1/2015 | Freeman et al. | |
| 2015/0047168 A1 | 2/2015 | James et al. | |
| 2015/0367456 A1 | 12/2015 | Ozbaysal et al. | |
| 2015/0375322 A1 | 12/2015 | Salm et al. | |
| 2015/0377037 A1 | 12/2015 | Salm et al. | |
| 2016/0032766 A1 | 2/2016 | Bunker et al. | |
| 2016/0177749 A1 | 6/2016 | Brandl et al. | |
| 2016/0230576 A1 | 8/2016 | Freeman et al. | |
| 2016/0339544 A1 | 11/2016 | Xu et al. | |
| 2016/0375461 A1 | 12/2016 | Taylor | |
| 2017/0252870 A1 | 9/2017 | Cui et al. | |
| 2018/0073390 A1 | 3/2018 | Varney | |
| 2018/0073396 A1 | 3/2018 | Varney | |
| 2018/0093354 A1 | 4/2018 | Cui et al. | |
| 2020/0368857 A1 | 11/2020 | Henderkott et al. | |
| 2023/0033578 A1 | 2/2023 | Bulgrin et al. | |

FOREIGN PATENT DOCUMENTS

| | | |
|---|---|---|
| DE | 102006005364 A1 | 8/2007 |
| DE | 102008007820 A1 | 8/2009 |
| DE | 102008058140 A1 | 5/2010 |
| EP | 1503144 A1 | 2/2005 |
| EP | 1528322 A2 | 5/2005 |
| EP | 1584702 A1 | 10/2005 |
| EP | 1803521 A1 | 7/2007 |
| EP | 1880793 A2 | 1/2008 |
| EP | 1884306 A1 | 2/2008 |
| EP | 2206575 A1 | 7/2010 |
| EP | 2578720 A2 | 4/2013 |
| EP | 2700788 A1 | 2/2014 |
| EP | 2713007 A1 | 4/2014 |
| EP | 3061556 A1 | 8/2016 |
| WO | 2012092279 A1 | 7/2012 |
| WO | 2015147929 A2 | 10/2015 |

OTHER PUBLICATIONS

Intent to Grant dated Mar. 29, 2018, from counterpart European Application No. 16157440.5, 29 pp.
Notice of Eligibility for Grant dated Jan. 2, 2019, from counterpart Singaporean Application No. 10201601470P, 8 pp.
Notice of Intent to Grant from counterpart European Application No. 16157440.5, dated Nov. 22, 2017, 7 pp.

(56) References Cited

OTHER PUBLICATIONS

Notice of Opposition, and translation thereof, from counterpart European Application No. 16157440.5, dated Jan. 23, 2019, 31 pp.
Prosecution History from U.S. Appl. No. 15/053,082 dated Apr. 6, 2018 through May 13, 2020, 90 pgs.
Prosecution History from U.S. Appl. No. 16/984,624, dated Sep. 1, 2020 through Apr. 7, 2023, 72 pp.
Response to Search Report dated Jul. 28, 2016, from counterpart European Application No. 16157440.5, filed Feb. 23, 2017, 9 pp.

* cited by examiner

US 12,157,192 B2

REPAIR OF DUAL WALLED METALLIC COMPONENTS USING BRAZE MATERIAL

This application is a continuation of U.S. patent application Ser. No. 16/984,624, filed Aug. 4, 2020, which is a divisional of U.S. patent application Ser. No. 15/053,082, filed Feb. 25, 2016, now U.S. Pat. No. 10,766,105, which claims the benefit of U.S. Provisional Application No. 62/121,269, filed Feb. 26, 2015. The entire contents of each of these applications are incorporated herein by reference.

TECHNICAL FIELD

The disclosure relates to techniques for repairing dual walled metallic components using a braze material.

BACKGROUND

Dual walled components may be used in high temperature mechanical systems, such as gas turbine engines. A dual walled component may include a spar, which provides structural support and is the main load bearing element of the dual walled component. The spar may include a plurality of pedestals to which a coversheet or outer wall is attached. The coversheet defines the outer surface of the dual walled component, and may function as a heat shield. Cooling fluid, such as air, may be passed through the volume between the spar and the back side of the coversheet to aid in cooling the coversheet. Due to this back side cooling, dual walled components may allow use of higher operating temperatures than single walled components.

SUMMARY

In some examples, the disclosure described a method for repairing a dual walled component comprising a spar comprising a plurality of pedestals and a coversheet attached to the plurality of pedestals. The method may include removing a damaged portion of the coversheet from the dual walled component to expose a plurality of exposed pedestals and define a repair location and an adjacent coversheet portion. The method also may include filling space between the plurality of exposed pedestals with a stop material, wherein the stop material defines a surface substantially aligned with a pedestal-contacting surface of the adjacent coversheet portion. In some examples, the method additionally includes positioning a braze material on the surface of the stop material and attaching the braze material to the plurality of exposed pedestals and adjacent coversheet portion to form a repaired coversheet portion.

In some examples, the disclosure describes a dual walled component that includes a spar including a plurality of pedestals, a coversheet attached to a first set of pedestals from the plurality of pedestals, and a repaired coversheet portion attached to a second set of pedestals from the plurality of pedestals and to the coversheet. The repaired coversheet portion includes a braze material.

The details of one or more examples are set forth in the accompanying drawings and the description below. Other features, objects, and advantages will be apparent from the description and drawings, and from the claims.

DETAILED DESCRIPTION

The disclosure describes techniques for repairing a dual walled component using a braze patch. As described above, a dual walled component includes a spar and a coversheet or outer wall. The spar may include a plurality of pedestals to which the coversheet is attached.

Although the dual walled component may allow use of high temperatures due to the cooling provided by the back side cooling channels, the coversheet may be relatively thin. Because of this, the coversheet may be relatively easily damaged, e.g., by mechanical impact or chemical reaction with species in the operating environment, such as calcia-magnesia-alumina-silicate (CMAS). Further, because the coversheet is relatively thin and the pedestals are relatively small (e.g., thousandths of an inch), repair of the coversheet may be relatively difficult. Hence, some damaged dual walled components may be discarded rather than repaired.

In accordance with examples of this disclosure, a braze material may be used to repair the coversheet and, in some examples, the pedestals of a dual walled component. For example, a portion of a coversheet may be damaged by mechanical impact with an object or reaction with a chemical species in the operating environment of the dual walled component. The damaged portion may be removed along with, in some examples, part of an undamaged portion of the coversheet adjacent to the damaged portion to define a repair location. Removing the damaged portion of the coversheet may expose some pedestals of the spar. A braze material then may be attached to the plurality of exposed pedestals and adjacent coversheet and form a repaired coversheet portion.

In some examples, space between the plurality of exposed pedestals may be filled with a stop material. The stop material may define a surface substantially aligned with a pedestal-contacting surface of the adjacent coversheet portion, so that an inner surface (a surface toward the pedestals) of the repaired coversheet portion will be substantially aligned with the inner (pedestal-contacting) surface of the adjacent coversheet portion. After the stop material is filled in the space, braze material, either in the form of a braze preform or a braze paste may be positioned on the surface of the stop material and adjacent to the exposed pedestals and adjacent coversheet, to form the repaired coversheet portion attached to the exposed pedestals and the adjacent coversheet. The braze material then may be heated to join the braze material to the exposed pedestals and adjacent coversheet. In this way, the techniques described herein may be used to repair a dual walled component with a braze material.

Figure 1:
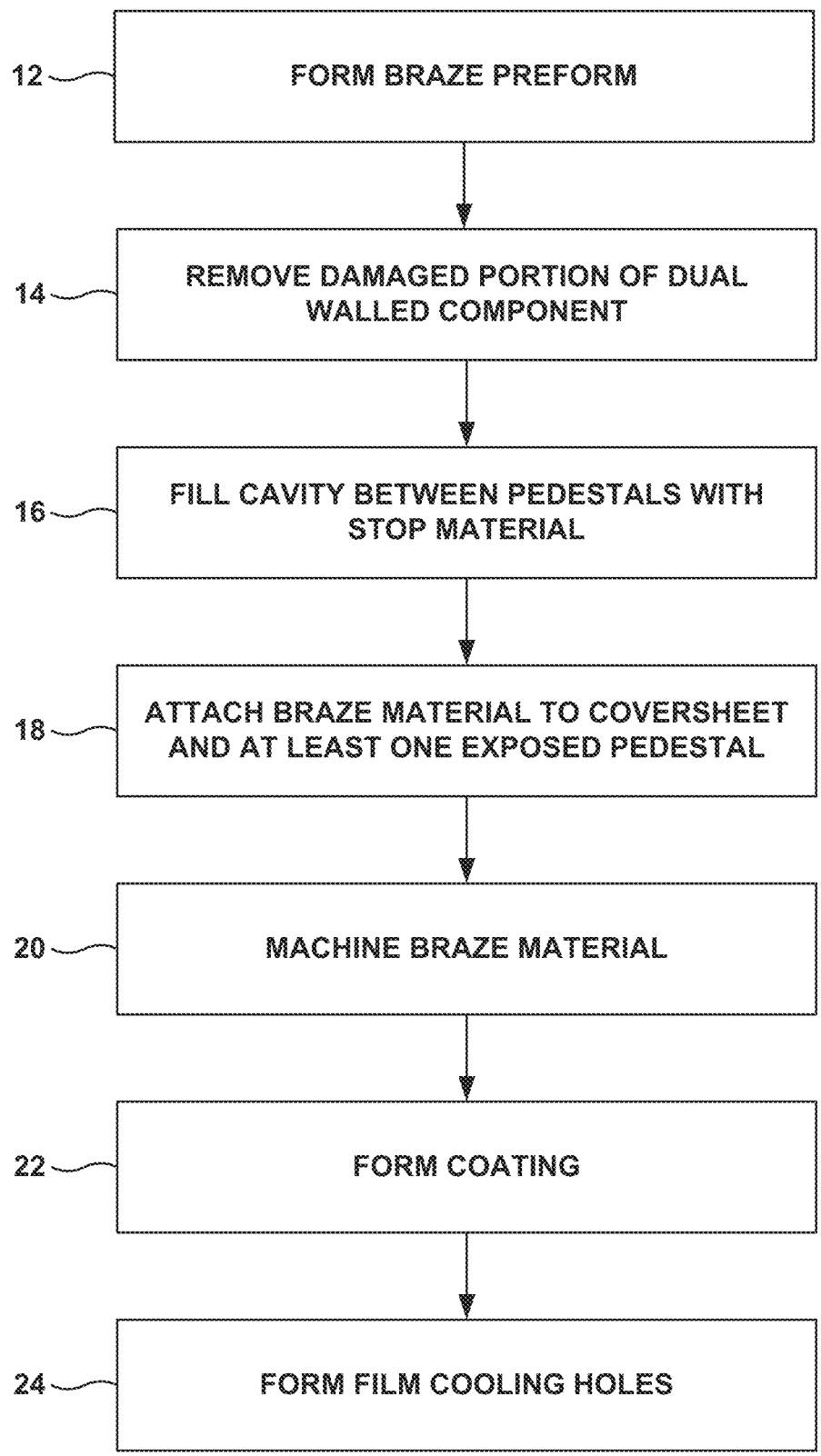
FIG. 1 is a flow diagram illustrating an example technique for repairing a dual walled component using a braze material.

FIG. 1 is a flow diagram illustrating an example technique for repairing a dual walled component using a braze material. The technique of FIG. 1 will be described with concurrent reference to the conceptual diagrams of FIGS. 2-7 for purposes of illustration only. However, it will be understood that in other examples, the technique of FIG. 3 may be used to repair other dual walled components, or both.

Figure 2:
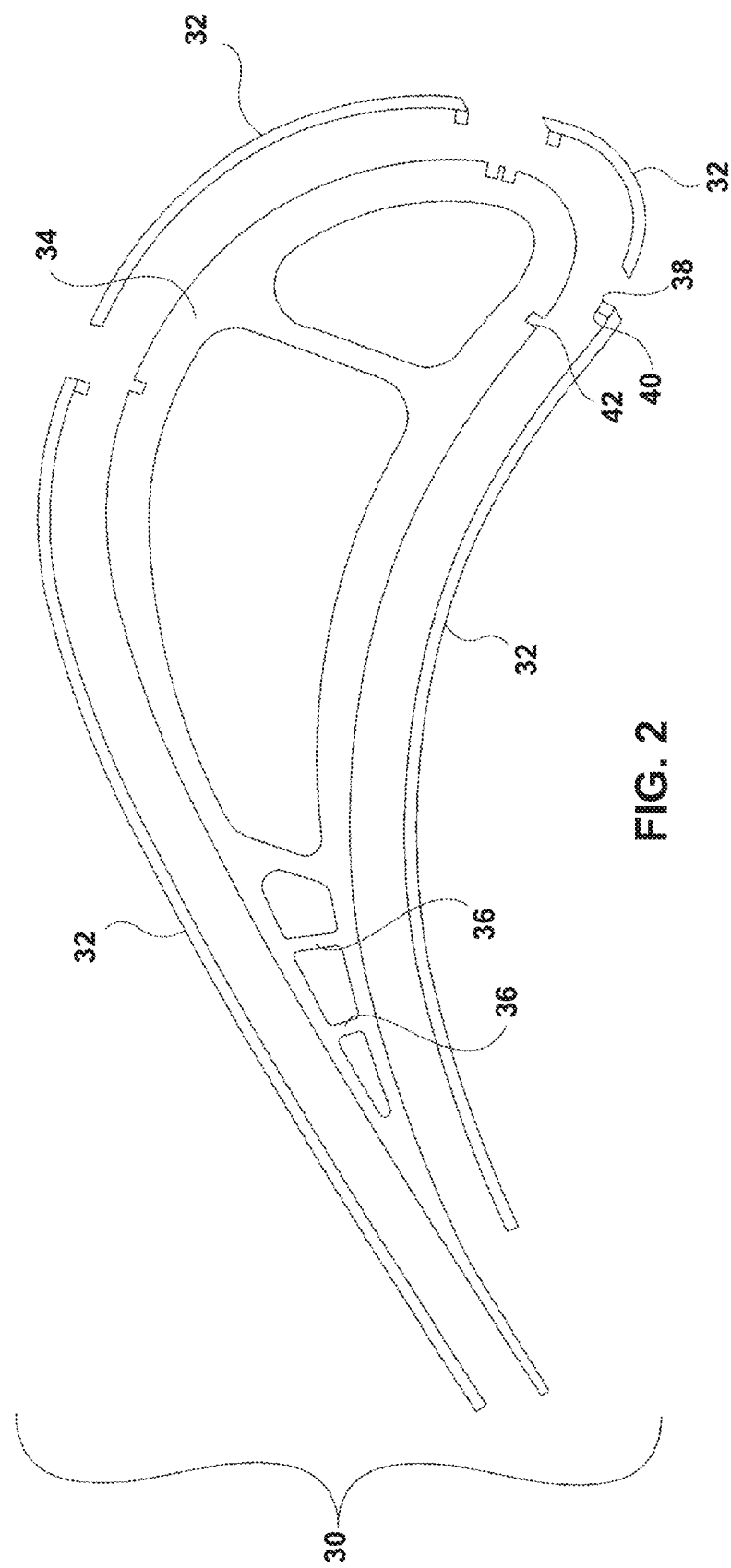
FIG. 2 is an exploded sectional view of an example dual walled component including a coversheet and a spar.

FIG. 2 is an exploded sectional view of an example dual walled component 30 including a coversheet 32 and a spar 34, which may be repaired with a braze material using the technique illustrated in FIG. 1. Coversheet 32 and spar 34 may be joined using brazing or diffusion bonding. In the example of FIG. 2, dual walled component 30 is an airfoil for a gas turbine engine. In other examples, dual walled component repaired with a braze material using the technique illustrated in FIG. 1 may be a combustor liner or the like. Each of coversheet 32 and spar 34 are preformed, and may be cast or wrought. In the example of FIG. 2, coversheet 32 includes a plurality of members (e.g., four members). In other examples, coversheet 32 may include more or fewer members.

Coversheet 32 is shaped to substantially correspond to an outer surface of spar 34. In some examples, coversheet 32 and spar 34 may be formed of similar materials, such as similar alloys. In other examples, coversheet 32 and spar 34 may be formed of different materials, selected to provide different properties. For example, spar 34 may be formed of a material selected to provide strength to dual walled component 30, while coversheet 32 is formed of a material selected to provide resistance to oxidation or a relatively low coefficient of thermal expansion. In some examples, the alloys from which coversheet 32 and spar 34 are formed may include a Ni-based alloy, a Co-based alloy, a Ti-based alloy, or the like.

Spar 34 may also include a plurality of pedestals on an outer surface of the walls of spar 34, to which coversheet 32 are joined. The plurality of pedestals may help define channels between spar 34 and coversheet 32 through which cooling fluid (e.g., air) may flow. In some examples, coversheet 32 and spar 34 include one or more locating features 38 including protrusion 40 of coversheet 32 and complementary depression 42 of spar 34. The locating features 38 may assist with positioning coversheet 32 relative to spar 34.

Figure 3:
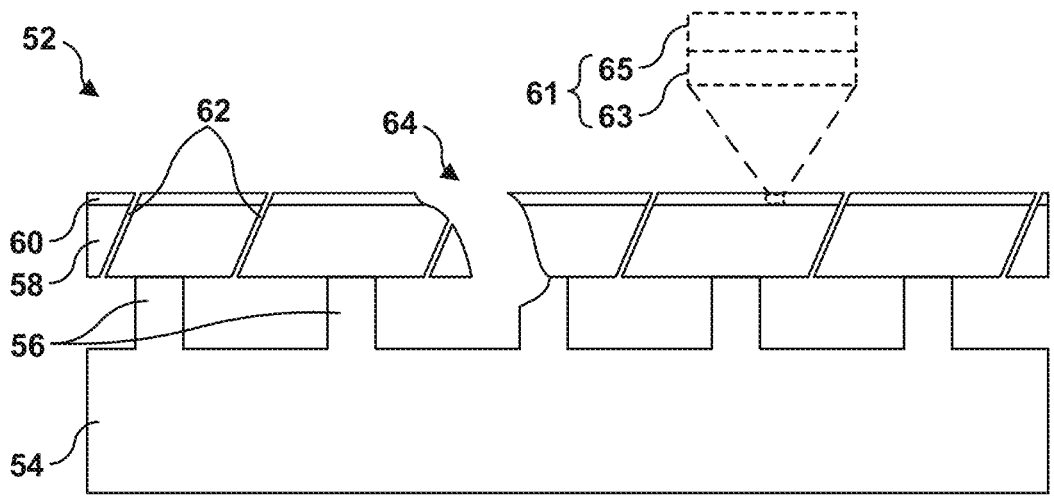
FIG. 3 is a conceptual and schematic diagram illustrating an example damaged dual walled component.

FIG. 3 is a conceptual and schematic diagram illustrating an example dual walled component 52 that is damaged. As shown in FIG. 3, a dual walled component 52 includes a spar 54, which defines an inner wall of dual walled component 52 and includes a plurality of pedestals 56. A coversheet 58 or outer wall is attached to plurality of pedestals 56. In some examples, each of plurality of pedestals 56 may define a height of between about 0.005 inch (about 0.127 mm) and about 0.040 inch (about 1.016 mm). In some examples, a spacing between adjacent pedestals of plurality of pedestals 56 may be between about 0.015 inch (about 0.381 mm) and about 0.020 (about 0.508 mm).

In some examples, an external surface (opposite plurality of pedestals 56) of coversheet 58 may be coated with a coating 60, which may include, for example, a thermal barrier coating 61. Thermal barrier coating 61 may include a bond coat 63 on coversheet 58 and a thermally insulative layer 65 on bond coat 63. Thermally insulative layer 65 may include, for example, yttria or hafnia partially or fully stabilized with a rare earth oxide, such as yttria.

Coversheet 58 also may include a plurality of film cooling holes 62. Each of plurality of film cooling holes 62 may extend from an outer surface to an inner surface of coversheet 58. Each of plurality of film cooling holes 62 fluidically connects to a cavity defined by coversheet 58 and spar 54. Cooling fluid, such as air, may flow through the cavity and exit through film cooling holes 62 to help cool coversheet 58.

Damaged dual walled component 52 includes a damaged portion 64. In the example illustrated in FIG. 3, damaged portion 64 extends through the thickness of coversheet 58 and includes a portion of one of the plurality of pedestals 56. In other examples, damaged portion 64 may extend only partially through the thickness of coversheet 58, may not include a portion of one of the plurality of pedestals 56, or both. Damaged portion 64 may be due to mechanical impact, chemical reaction with an environmental species, or the like.

As described briefly above, the braze material used in the repair technique illustrated in FIG. 1 may include a braze preform, powder, paste, tape, rod, ribbon, wire, or the like. In some examples in which the braze material includes a braze preform, the technique of FIG. 1 optionally may include forming a braze preform (12). In some examples, the braze preform may be formed from a larger part using a machining process, such as an adaptive machining technique. In an adaptive machining technique, a non-contact technique may be used to inspect damaged portion 64 and, optionally, an adjacent portion of coversheet 58, to obtain dimensional surface data of damaged portion 64. In some examples, the non-contact technique may utilize a coordinate measuring machine (CMM) that determines coordinates of points at multiple locations of damaged portion 64, and, optionally, an adjacent portion of coversheet 58. The measured dimensional surface data can include any number, or set or multiple sets, of point coordinates that the non-contact technique indicates are on the surface of damaged portion 64, and, optionally, an adjacent portion of coversheet 58, at various (different) locations. As will be appreciated, the greater the number of points, which can be in the hundreds to millions or more, in a set or multiple sets, the more robust the measured dimensional surface data will be in establishing the shape (and location) of damaged portion 64, and, optionally, an adjacent portion of coversheet 58.

The measured dimensional surface data then can be compared to surface model data of dual walled component 52, or at least the portion of coversheet 58 that includes damaged portion 64, and, optionally, the adjacent portion of coversheet 58 to generate a compromise surface model. The surface model data can include any suitable mathematical model, for example, in the form of one or more curves or surfaces, including splines or non-uniform rational basis splines (NURBS), for example, that represent (model) the airfoil spar surface. In some examples, the surface model data can include a design intent surface of dual walled component 52, defined by, for example, CAD spline knots. In some examples, the design intent surface can represent the ideal surface of dual walled component 52, that is the "perfect world" representation of the component surface, before, for example, the consideration of tolerances, and before the damage to coversheet 58 that resulted in damaged portion 64.

In some examples, the surface model data may be modified to arrive at the compromise surface model by performing a six degree of freedom (DOF) best-fit of surface model data to the measured dimensional surface data. In some examples, the surface model data may be best-fit to the measured dimensional surface data to account for possible misalignment caused by, for example, uncertainty in the orientation of dual walled component 52 during measurement of the dimensional surface data. Alternatively, the measured dimensional surface data may be best-fit to the surface model data to arrive at the compromise surface model.

In some examples, the compromise surface model may be determined using any suitable numerical analysis. For example, a weighted nonlinear least squares minimization to rotate and translate the surface model data to arrive at the compromise surface model. Further, any suitable techniques for solving multidimensional nonlinear problems can be employed; non-limiting examples include Newton-Raphson, sequential over-relaxation, genetic algorithms, gradient methods, among others.

In some examples, when determining the compromise surface model, the geometry of damaged portion 64 may be discarded, as the geometry of damaged portion 64 may deviate so significantly from the surface model data to be unrepresentative of the original shape of coversheet. In some such examples, the measured dimensional data of the adjacent portion of coversheet 58 may be compared to the surface model data to arrive at a compromise surface model for that portion of the braze preform, and the surface model data may be used for the compromise surface model for damaged portion 64.

Once the compromise surface model has been determined, a sintered braze material may be machined to define the braze preform. In other examples, adaptive machining may not be used to form the braze preform, and the braze preform may have a shape defined by the model surface data or a generic shape (e.g., a sheet). In still other examples, the technique of FIG. 1 may not including forming a braze preform (12).

Figure 4:
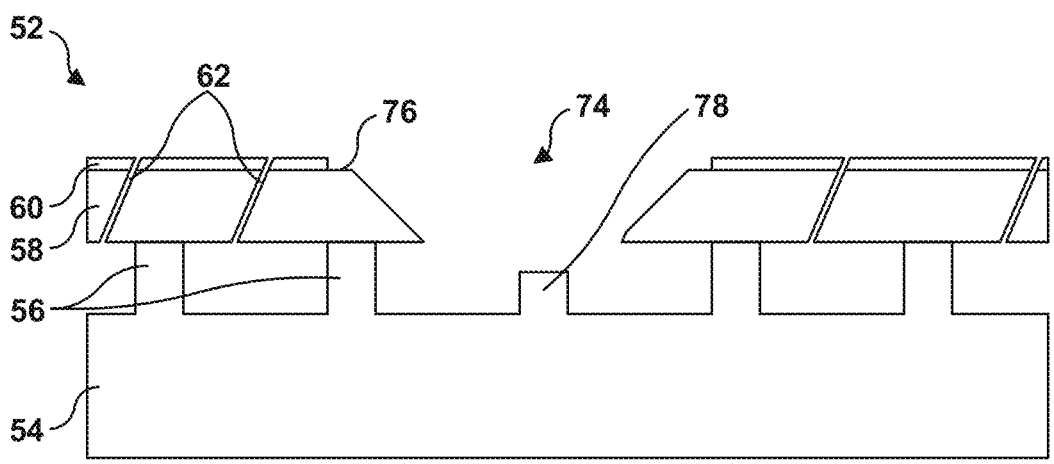
FIG. 4 is a conceptual and schematic diagram illustrating an example dual walled component after a damaged portion has been removed.
Figure 5:
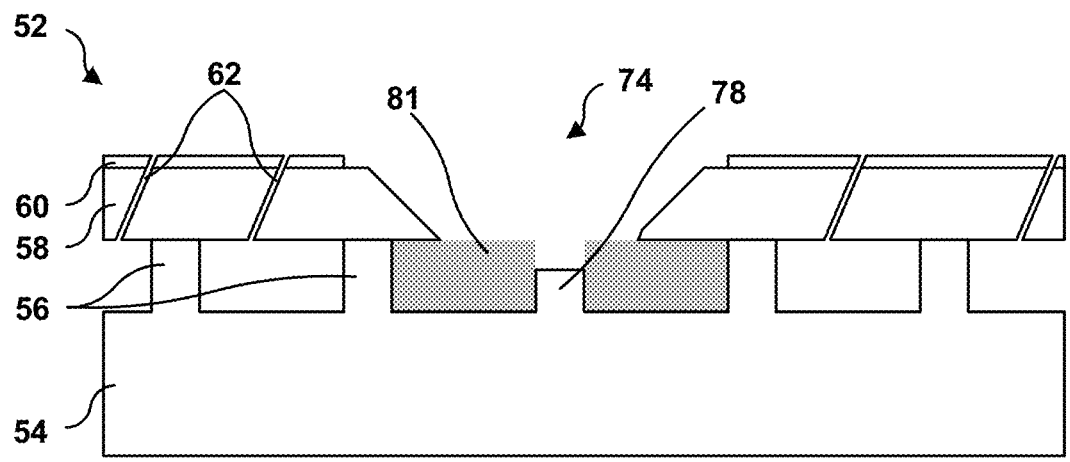
FIG. 5 is a conceptual and schematic diagram illustrating an example dual walled component after a damaged portion has been removed and spaces around pedestals filled with stop material.

The technique of FIG. 1 includes removing damaged portion 64 of dual walled component 52 (14). The resulting dual walled component 52 with damaged portion 64 removed is shown in FIG. 4. In some examples, removing the damaged portion 64 of dual walled component 52 (14) may include removing at least part of coating 60 on at least damaged portion 64 of dual walled component 52. In some examples, coating 60 may be removed from all of dual walled component 52. In other examples, coating 60 may be removed from the damaged portion 64 and an adjacent portion of coversheet 58, but not all of dual walled component 52. For example, as shown in FIG. 4, coating 60 may be removed to uncover part of outer surface 76 of coversheet 58. This may facilitate repair of coversheet 58 (e.g., joining of material to coversheet 58) and subsequent working of the repaired portion (e.g., machining the repaired portion to smooth the interface between the repaired portion and coversheet 58).

Removing damaged portion 64 (14) may include the damaged portion 64 of the coversheet 58, and, in some examples, an undamaged adjacent portion of coversheet 58, as shown in FIG. 4. By removing the undamaged adjacent portion of coversheet 58, a clean and undamaged portion of coversheet 58 may be exposed, which may facilitate attaching the material forming the repaired coversheet portion to the remainder of dual walled component 52.

In some examples, in addition to coversheet 58 being damaged, at least some of the plurality of pedestals 56 may be damaged, as shown in FIG. 3. Hence, in some examples, removing damaged portion 64 of dual walled component 52 (14) may include removing at least the damaged portions of any damaged pedestals 56.

Removing damaged portion 64 of dual walled component 52 (14) may include using mechanical techniques, such as grinding, drilling, cutting, or the like to remove the damaged portion 64. Removing damaged portion 64 of dual walled component 52 (14) may define a repair location 74 (FIG. 4) and an adjacent coversheet portion, and may expose one or more exposed pedestals 78 that were underlying damaged portion 64 of coversheet 58. Removing damaged portion 64 of dual walled component 52 (14) may leave the internal structure of dual walled component 52, including the geometry of cooling channels defined by spar 54 and pedestals 56 substantially intact.

The technique of FIG. 1 also includes filling a cavity between pedestals 56 and 78 with stop material 81 (FIG. 5) (16). For example, a cavity between exposed pedestal 78 and adjacent pedestals 56 may be filled with stop material 81 such that an outer surface of the stop material 81 is substantially aligned with an inner surface of the adjacent portions of coversheet 58.

Stop material 81 may include a high melting temperature refractive material that does not react with adjacent portions of dual walled component 52 (e.g., exposed pedestal 78, plurality of pedestals 56, spar 54, and/or coversheet 58). For example, the high melting temperature refractive material may have a melting temperature greater than the temperature at which the braze material is heated to join the braze material to coversheet 58 and exposed pedestal 78. For example, stop material 81 may include an oxide, such as yttrium oxide, aluminum oxide, or the like, mixed with a binder. The binder may include, for example, a water- or alcohol-based binder. In some examples, stop material 81 that includes an oxide and a binder may be in the form of a tape, a preform, a rope, a powder, or the like.

In other examples, stop material 81 may include a refractory metal, such as molybdenum; or the like. The refractory metal may be in the form of a sheet or other preform. In some examples, the tape, preform, or rope may be shaped to define the outer surface of stop material 81 substantially aligned with an inner surface of the adjacent portions of coversheet 58 and, if applicable, to help define a shape of any portions of exposed pedestal 78 to be repaired. Alternatively or additionally, the tape, preform, or rope may be shaped to define the outer surface of stop material 81 substantially aligned with tops of undamaged exposed pedestals.

Figure 6:
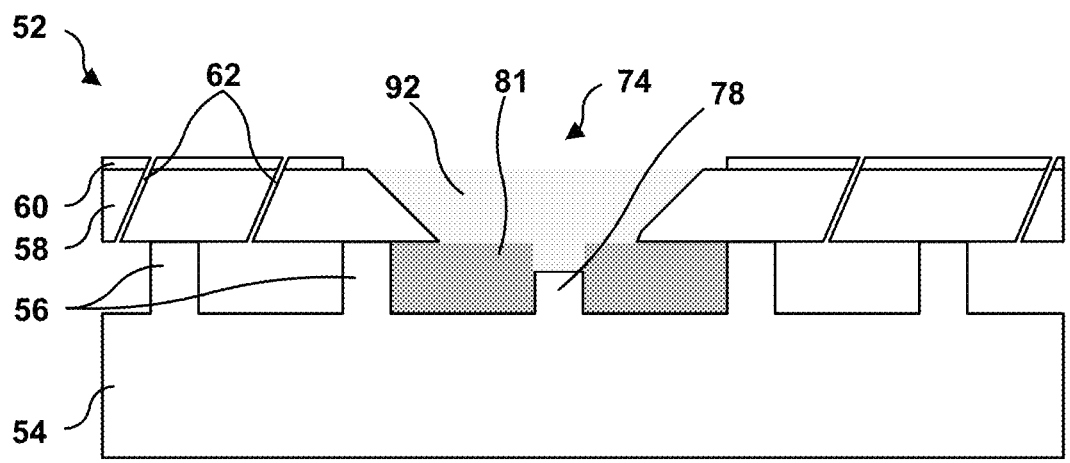
FIG. 6 is a conceptual and schematic diagram illustrating an example dual walled component after a damaged portion has been removed, spaces around pedestals have been filled with stop material, and braze material has been introduced to a repair location.

The technique of FIG. 1 also may include attaching braze material to coversheet 58 and at least one exposed pedestal 78 (18). In some examples, attaching braze material to coversheet 58 and at least one exposed pedestal 78 (18) may first includes positioning the braze material 92 on stop material 81 in repair location 74, as shown in FIG. 6.

In some examples, the braze material may include a braze preform. The braze preform may define a shape that substantially conforms to the shape of the portion of coversheet 58 that was removed when removing damaged portion 64. A braze preform may reduce shrinkage compared to a braze paste, and thus may improve a fit of braze material 92 to coversheet 58. The braze preform may be positioned on stop material 81 by placing the braze preform at repair location 74.

In other examples, braze material 92 may include a powder, a paste (e.g., powder carried by a solvent), a rod, a ribbon, a wire, or the like. Braze material 92 may not be preformed to substantially conform to the shape of the portion of coversheet 58 that was removed when removing damaged portion 64. Braze material 92 may be positioned using any of a variety of techniques, including, for example, spreading; dispensing with a syringe; positioning individual ribbons, wires, or rods; or the like. In some examples, after positioning braze material 92, the braze material 92 may substantially conform to the shape of the portion of coversheet 58 that was removed when removing damaged portion 64, even if braze material 92 does not include a braze preform.

Braze material 92 may include any suitable braze composition, such as a metal or an alloy. For example, if coversheet 58 includes a Ni- or Co-based superalloy, braze material 92 may include a braze of similar composition. In other examples, braze material 92 may include an alloy having a different composition than coversheet 58. For example, damaged portion 64 may be have been damaged due to localized conditions, such as higher temperatures, exposure to certain environmental contaminants, or higher mechanical stresses, which are not common to all portions of coversheet 58. In some such examples, braze material 92 may include an alloy having a composition selected to better resist the localized conditions compared to the alloy from which the remainder of coversheet 58 is formed. Regardless of the composition of braze material 92 compared to coversheet 58, the composition of braze material 92 may be selected such that the coefficient of thermal expansion is sufficiently similar that thermal cycling of dual walled component 52 does not result in sufficient levels of stress to cause of the interface between coversheet 58 and braze material 92 to crack or fail.

In some examples, braze material 92 may include a wide gap braze composition, which includes particles of a high temperature alloy within mixed with a braze alloy comparable to the high temperature alloy constituents. For example, a wide gap braze composition may include a nickel-based braze mixed with particles of a nickel-based superalloy or a cobalt-based braze mixed with particles of a cobalt-based alloy.

Regardless of the braze material 92 used, attaching braze material 92 to coversheet 58 and at least one exposed pedestal 78 (18) may also include heating at least the braze material 92 to cause the braze material 92 to join to coversheet 58 and at least one exposed pedestal 78. For example, at least the braze material 92 may be heated to a temperature between about 1,500° F. (about 815° C.) and about 2,400° F. (about 1315° C.) to cause the braze material 92 to join to coversheet 58 and at least one exposed pedestal 78. In some examples, dual walled component 52 and braze material 92 may be enclosed in a vacuum furnace, and both dual walled component 52 and braze material 92 may be heated within the vacuum furnace. Vacuum brazing may result in substantial temperature uniformity within dual walled component 52 and braze material 92, which may reduce residual stresses at the interface of dual walled component 52 and braze material 92.

In some examples, induction heating may be used to heat braze material 92. For example, induction heating may be substantially localized to braze material 92, leaving substantially all of dual walled component at a lower temperature than the braze temperature. Localized heating of braze material 92 using induction heating may reduce dimensional nonconformance of dual walled component 52, which may occur if all of dual walled component 52 is heated during the brazing technique.

After formation of the repaired coversheet portion, stop material 81 may be removed. For example, dual walled component 52 may be heated to heat stop material 81 in examples in which stop material 81 includes a refractory oxide and a binder. Stop material 81 may be heated to a temperature sufficient to burn the binder, creating a powder including the burned binder and the refractive oxide. This powder then may be removed, e.g., by flowing a pressurized fluid through the cavities between coversheet 58 and spar 74. In other examples, such as examples in which stop material 81 includes a refractory metal, a chemical etching technique may be used to remove stop material 81. The etchant may be selected to react with the refractory metal while not reacting with the parts of dual walled component 52.

Figure 7:
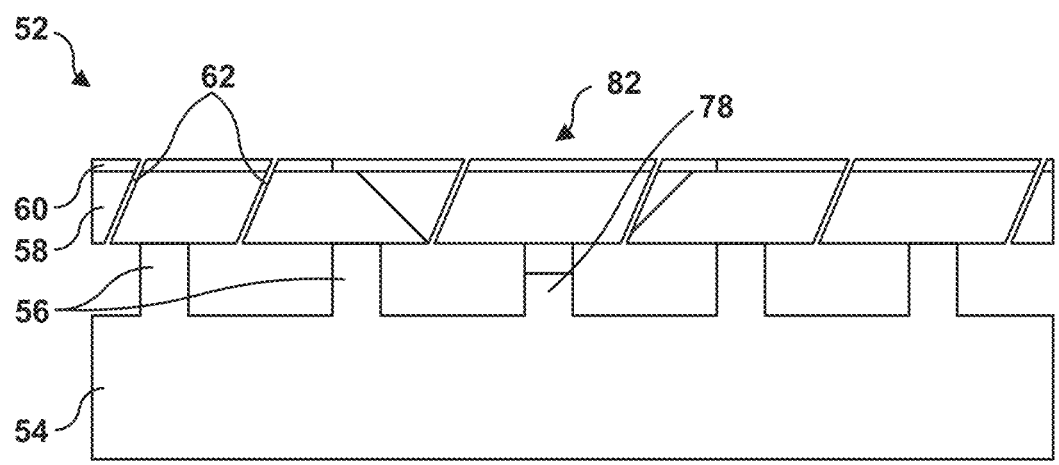
FIG. 7 is a conceptual and schematic diagram illustrating an example dual walled component including a portion that has been repaired using a braze material.

FIG. 7 is a conceptual and schematic diagram illustrating dual walled component 52 including a repaired coversheet portion 82 that has been repaired using braze material 92. Repaired coversheet portion 82 may be attached to any exposed pedestals 78 and portions of coversheet 58 adjacent to repair location 74.

As shown in FIG. 7, in some examples, repaired coversheet portion 82 may substantially conform to the shape of the previous coversheet in repair location 74 and may include an outer surface that is substantially aligned with the outer surface of coversheet 58. In some examples, this may be the result of using a braze preform.

Additionally or alternatively, the technique of FIG. 1 may include machining repaired coversheet portion 82 (20). For example, grinding, polishing, or other machining techniques may be used to smooth the interface between repaired coversheet portion 82 and coversheet 58. In some examples, an adaptive machining technique may be utilized to determine the machining to be performed to smooth the interface between repaired coversheet portion 82 and coversheet 58.

In an adaptive machining technique, a non-contact technique may be used to inspect repaired coversheet portion 82 and, optionally, an adjacent portion of coversheet 58, to obtain dimensional surface data of repaired coversheet portion 82. In some examples, the non-contact technique may utilize a coordinate measuring machine (CMM) that determines coordinates of points at multiple locations of repaired coversheet portion 82, and, optionally, an adjacent portion of coversheet 58. The measured dimensional surface data can include any number, or set or multiple sets, of point coordinates that the non-contact technique indicates are on the surface of repaired coversheet portion 82, and, optionally, an adjacent portion of coversheet 58, at various (different) locations. As will be appreciated, the greater the number of points, which can be in the hundreds to millions or more, in a set or multiple sets, the more robust the measured dimensional surface data will be in establishing the shape (and location) of repaired coversheet portion 82, and, optionally, an adjacent portion of coversheet 58.

The measured dimensional surface data then can be compared to surface model data of dual walled component 52, or at least the portion of coversheet 58 that includes repaired coversheet portion 82, and, optionally, the adjacent portion of coversheet 58 to generate a compromise surface model. The surface model data can include any suitable mathematical model, for example, in the form of one or more curves or surfaces, including splines or non-uniform rational basis splines (NURBS), for example, that represent (model) the airfoil spar surface. In some examples, the surface model data can include a design intent surface of dual walled component 52, defined by, for example, CAD spline knots. In some examples, the design intent surface can represent the ideal surface of dual walled component 52, that is the "perfect world" representation of the component surface, before, for example, the consideration of tolerances.

In some examples, the surface model data may be modified to arrive at the compromise surface model by performing a six degree of freedom (DOF) best-fit of surface model data to the measured dimensional surface data. In some examples, the surface model data may be best-fit to the measured dimensional surface data to account for possible misalignment caused by, for example, uncertainty in the orientation of dual walled component 52 during measurement of the dimensional surface data. Alternatively, the measured dimensional surface data may be best-fit to the surface model data to arrive at the compromise surface model.

In some examples, the compromise surface model may be determined using any suitable numerical analysis. For example, a weighted nonlinear least squares minimization to rotate and translate the surface model data to arrive at the compromise surface model. Further, any suitable techniques for solving multidimensional nonlinear problems can be employed; non-limiting examples include Newton-Raphson, sequential over-relaxation, genetic algorithms, gradient methods, among others.

Once the compromise surface model has been determined, repaired coversheet portion 82 and adjacent portions of coversheet 58 may be machined based on the compromise surface data.

In some examples, the technique of FIG. 1 may optionally include forming coating 60 on repaired coversheet portion 82 and any other exposed outer surface of coversheet 58 (22). In some examples, coating 60 on repaired coversheet portion 82 may be the substantially the same as (e.g., the same as or nearly the same as) coating 60 on coversheet 58. In other examples, coating 80 on repaired coversheet portion 82 may be different than coating 60 on coversheet 58. Regardless, in some examples, coating 60 may be a thermal barrier coating and may include a bond layer and at least one thermally insulative layer.

In some examples, the technique of FIG. 1 may optionally include forming film cooling holes 62 in repaired coversheet portion 82 (24). Forming film cooling holes 562 may utilize mechanical working, such as drilling, energy drilling, such as laser drilling, or the like. In some examples, film cooling holes 62 may be formed at locations corresponding to locations of previous cooling holes in damaged portion 64. In this way, the technique of FIG. 1 may utilize a braze material to repair coversheet 58 and, optionally, at least one pedestal of plurality of pedestals 56.

As will be appreciated, in these ways a braze material may be used to repair coversheets and, optionally, pedestals of dual walled components, such as combustor liners or gas turbine engine blades. This may facilitate repair of dual walled components rather than requiring damaged dual walled components to be discarded and replaced with new dual walled components, thus providing cost savings.

Various examples have been described. These and other examples are within the scope of the following claims.

The invention claimed is:

1. A dual walled component comprising:
  a spar comprising a plurality of pedestals;
  a coversheet attached to a first set of pedestals from the plurality of pedestals;
  a repaired coversheet portion attached to the coversheet continuously and to a second set of pedestals from the plurality of pedestals; and
  a coating comprising:
    a first portion overlying the coversheet; and
    a second portion overlying the repaired coversheet portion.

2. The dual walled component of claim 1,
  wherein the first portion of the coating overlies a first portion of the coversheet, and
  wherein the second portion of the coating overlies the repaired coversheet portion and a second portion of the coversheet.

3. The dual walled component of claim 1, wherein the coating comprises a thermal barrier coating.

4. The dual walled component of claim 3, wherein the thermal barrier coating comprises a bond coat and at least one thermally insulative layer on the bond coat.

5. The dual walled component of claim 4, wherein the at least one thermally insulative layer comprises at least one of yttria partially or fully stabilized with a rare earth oxide or hafnia partially or fully stabilized with a rare earth oxide.

6. The dual walled component of claim 1, wherein a composition of the first portion of the coating is substantially the same as a composition of the second portion of the coating.

7. The dual walled component of claim 1, wherein a composition of the first portion of the coating is different from a composition of the second portion of the coating.

8. The dual walled component of claim 1, wherein the repaired coversheet portion comprises at least one of a braze alloy or a wide gap braze alloy derived from a braze material.

9. The dual walled component of claim 8, wherein the repaired coversheet portion comprises the wide gap braze alloy derived from the braze material, and wherein the braze material comprises a braze preform.

10. The dual walled component of claim 1, wherein the coversheet comprises a first alloy, and wherein the repaired coversheet portion comprises a second alloy different from the first alloy.

11. The dual walled component of claim 1, wherein the spar, the coversheet, and the repaired coversheet portion define at least a portion of a component of a gas turbine engine.

12. The dual walled component of claim 1, wherein the coversheet defines an outer wall of the dual walled component.

13. The dual walled component of claim 1, wherein the repaired coversheet portion comprises a Ni-based alloy, a Co-based alloy, or a Ti-based alloy.

14. A method for repairing a dual walled component, comprising:
  removing a damaged portion of a coversheet and a damaged portion of a coating overlying the coversheet from a dual walled component to define a repair location and an adjacent coversheet portion, wherein the dual walled component comprises:
    a spar comprising a plurality of pedestals, wherein a second set of pedestals of the plurality of pedestals are exposed;
    the coversheet attached to a first set of pedestals from the plurality of pedestals; and
    a first portion of the coating overlying the adjacent coversheet portion;
  forming a repaired coversheet portion attached to the coversheet continuously and to the second set of pedestals; and
  forming a second portion of the coating on the repaired coversheet portion.

15. The method of claim 14,
  wherein the adjacent coversheet portion is a first portion of the coversheet,
  wherein the repair location includes a second portion of the coversheet, and wherein the second portion of the coating overlies the repaired coversheet portion and the second portion of the coversheet.

16. The method of claim 14, wherein forming the repaired coversheet portion further comprises:
   filling space between the second set of pedestals with a stop material, wherein the stop material defines a surface substantially aligned with a pedestal-contacting surface of the adjacent coversheet portion;
   positioning a braze material on the surface of the stop material; and
   attaching the braze material to the second set of pedestals and the adjacent coversheet portion.

17. The method of claim 14, wherein the coating comprises a thermal barrier coating.

18. The method of claim 17, wherein the thermal barrier coating comprises a bond coat and at least one thermally insulative layer on the bond coat.

19. The method of claim 14, wherein a composition of the first portion of the coating is substantially the same as a composition of the second portion of the coating.

20. The method of claim 14, wherein a composition of the first portion of the coating is different from a composition of the second portion of the coating.

* * * * *